April 30, 1929.  S. P. ERIKSSON  1,711,467

GRIPPING TOOL

Filed April 26, 1928

Inventor:
Stiko Per Eriksson,

Patented Apr. 30, 1929.

1,711,467

UNITED STATES PATENT OFFICE.

STIKO PER ERIKSSON, OF MORA, SWEDEN.

GRIPPING TOOL.

Application filed April 26, 1928, Serial No. 273,066, and in Sweden April 4, 1928.

This invention relates to a gripping tool for use in connection with baking plates or griddles, frying pans and the like, for withdrawing such implements from the respective ovens. This tool pertains to that type of tools for the purpose stated in which two jaws are pivotally connected with one another, as well as with a handle and are so designed and arranged that when they have seized the implement to be withdrawn they are kept in this position by the weight of that implement.

Figure 1:
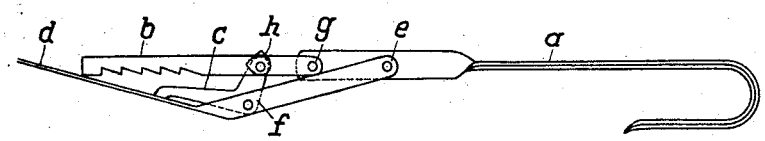
Figure 2:
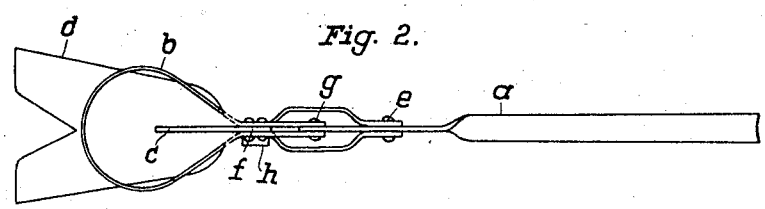

The improved gripping tool is illustrated diagrammatically and by way of example on the accompanying drawing on which Figure 1 is a side-view of the tool, the movable parts being in their position of rest; Figure 2 is a plan of the tool, the parts being also in their position of rest, Figure 3 is again a side-view, the parts being in the position they occupy when a baking plate is withdrawn, and Figure 4 is a similar view, the tool withdrawing a frying pan.

On the drawing, $a$ and $d$ (Figs. 1 and 3) denote the two jaws, of which $b$ is straight and $d$ is of angular shape. Both are pivotally connected with a grip $a$ by means of pivots $g$ and $e$, and the two jaws are, besides pivotally connected with one another by an angular member $c, f$. The jaw $b$ is straight, however, only in side view, as in Figs. 3 and 4. In plan (Fig. 2) it is to be seen that its operating part is bow-shaped, whereas the operative part of the jaw $d$ looks in plan somewhat like a spade or spatula having two rearwardly extending legs bent towards one another and receiving between its ends the pivot $e$ by which the member $f$ which looks like a bell-crank lever is connected with the grip $a$. This latter is partly hook-shaped in such a manner as to form a kind of handle, and it is distorted in itself for 90°, as shown in Figs. 1 and 2.

Figure 3:
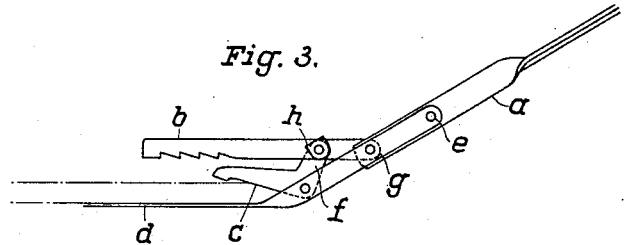
Figure 4:
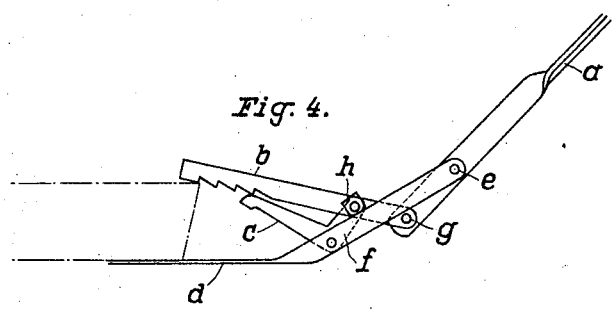

In the position of rest of the jaws, they contact with one another at their free ends, as in Fig. 1, and when in operative position for withdrawing a baking plate or griddle (merely partly indicated in Fig. 3 by dotted lines) the position is that shown in Fig. 3 in which the respective implement is grasped between the members $d$ and $c$, and when in operative position for withdrawing a frying pan (indicated in Fig. 4 by dotted lines which are more remote from one another than those shown in Fig. 3) this pan is grasped between the members $d$ and $b$ which latter is provided with retaining ratchet teeth, as shown.

I claim:

1. A gripping tool adapted for use in connection with baking plates or griddles, frying pans, or the like, comprising, in combination, a handle, an upper jaw hinged to it, a lower jaw also hinged to said handle, and an intermediate member shaped like a bell-crank lever and being pivotally connected with both jaws, the connection with the upper jaw being effected at the end of the lever-arm directed towards said jaw and the connection with the lower jaw being effected in the middle portion of said intermediate member, substantially as set forth.

2. A gripping tool adapted for use in connection with baking plates or griddles, frying pans, or the like comprising in combination a handle an upper bow-shaped jaw extending in a horizontal plane and being hinged to said handle, a lower jaw also hinged to said handle, and an intermediate member shaped like a bell-crank lever and being pivotally connected with both jaws, the connection with the upper jaw being effected at the end of the lever-arm directed towards said jaw and the connection with the lower jaw being effected in the middle portion of said intermediate member, substantially as set forth.

3. A gripping tool adapted for use in connection with baking plates or griddles, frying pans, or the like, comprising, in combination, a handle, a bow-shaped jaw extending in a horizontal plane and having ratchet-teeth at the lower edge of the bow and being hinged to said handle, and a lower jaw also hinged to said handle, and an intermediate member shaped like a bell-crank lever and being pivotally connected with both jaws, the connection with the upper jaw being effected at the end of the lever-arm directed towards said jaw and the connection with the lower jaw being effected in the middle portion of said intermediate member, substantially as set forth.

4. A gripping tool adapted for use in connection with baking plates or griddles, frying pans, or the like, comprising, in combination, a handle, an upper jaw hinged to it, a flat lower jaw also hinged to said handle and shaped similar to a spatula, and an intermediate member shaped like a bell-crank lever and being pivotally connected with both jaws, the connection with the upper jaw being effected at the end of the lever-arm directed towards said jaw and the connection with the lower jaw being effected in the middle portion of said intermediate member, substantially as set forth.

5. A gripping tool adapted for use in connection with baking plates or griddles, frying pans, or the like, comprising, in combination, a handle, an upper jaw hinged to it, a lower jaw hinged to said handle at a point located between the pivotal connection of said upper jaw and the grip portion of said handle, and an intermediate member shaped like a bell-crank lever and being pivotally connected with both jaws, the connection with the upper jaw being effected at the end of the lever-arm directed towards said jaw and the connection with the lower jaw being effected in the middle portion of said intermediate member, substantially as set forth.

In testimony whereof I affix my signature.

STIKO PER ERIKSSON.